United States Patent [19]

Oda et al.

[11] Patent Number: 4,686,026

[45] Date of Patent: Aug. 11, 1987

[54] METHOD OF INSTALLATION OF MEMBRANE TO ELECTROLYTIC CELL

[75] Inventors: Yoshio Oda; Tatsuro Asawa; Kimihiko Sato; Yasuo Sajima, all of Yokohama, Japan

[73] Assignee: Asahi Glass Company Ltd., Tokyo, Japan

[21] Appl. No.: 543,805

[22] Filed: Oct. 24, 1983

Related U.S. Application Data

[63] Continuation of Ser. No. 279,752, Jul. 2, 1981, abandoned.

[30] Foreign Application Priority Data

Jul. 11, 1980 [JP]  Japan ................................. 55-93866

[51] Int. Cl.$^4$ ............................................. C25B 13/00
[52] U.S. Cl. ...................................... 204/252; 204/296
[58] Field of Search ............................... 204/296, 252

[56] References Cited

U.S. PATENT DOCUMENTS

| | | | |
|---|---|---|---|
| 4,115,240 | 9/1978 | Asawa ................................. | 204/296 |
| 4,181,592 | 1/1980 | Babinsky ............................. | 204/283 |
| 4,183,793 | 1/1980 | Balko et al. ......................... | 204/98 |
| 4,206,022 | 6/1980 | Gunjima et al. ..................... | 204/98 |
| 4,311,567 | 1/1982 | White ................................. | 204/98 |
| 4,348,310 | 9/1982 | Silva et al. .......................... | 524/167 |

FOREIGN PATENT DOCUMENTS 2013242  8/1979  United Kingdom .

*Primary Examiner*—John F. Niebling
*Attorney, Agent, or Firm*—Oblon, Fisher, Spivak, McClelland & Maier

[57] ABSTRACT

A cation exchange membrane is installed to an electrolytic cell to be used in a form of a cation exchange membrane of a fluorinated polymer having ion exchange groups having the formula $$-(COO)_m X$$

wherein X represents an alkali metal atom or $-NRR'$ and R and R' respectively represent hydrogen atom or a lower alkyl group; and m represents a valence of m, by covering a membrane of a fluorinated polymer having ion exchange groups having the formula $$-COOL$$

wherein L represents hydrogen atom or a $C_1$–$C_{20}$ alkyl group on said electrode in the installation.

10 Claims, No Drawings

METHOD OF INSTALLATION OF MEMBRANE TO ELECTROLYTIC CELL

This application is a continuation of application Ser. No. 279,752, filed July 2, 1981 now abandoned.

BACKGROUND OF THE INVENTION

1. Field of the Invention

The present invention relates to a method of installation of an ion exchange membrane to an electrolytic cell. More particularly, it relates to a method of installation of a cation exchange membrane of a fluorinated polymer having carboxylic acid groups as the ion exchange groups to an electrolytic cell, preferably a finger type electrolic cell has been equipped with abestos diaphragms.

2. Description of the Prior Arts

In a process for producing an alkali metal hydroxide by an electrolysis of an alkali metal chloride, a membrane process has been mainly employed instead of the mercury process in view of prevention of a public pollution: As a membrane process, a process using a diaphragm such as a asbestos diaphragm has been industrially employed.

It has been known, as an electrolytic cell using asbestos diaphragm, to use Diamond Shamrock cell and Hooker cell which are finger type electrolytic cells wherein many anodes are fixed to stand from a bottom of the cell and many finger type cathodes coated with each asbestos diaphragm are inserted between the anodes to cover them. However, the alkali metal hydroxide obtained by the asbestos diaphragm process has a low concentration and contains the impurity of the alkali metal chloride whereby the alkali metal hydroxide can not be directly used for many industrial uses such as productions of industrial chemicals.

Various processes using an ion exchange membrane instead of the asbestos diaphragm have been proposed to obtain an alkali metal hydroxide having high purity and high concentration. In view of an alkaline resistance and a chemical resistance, a cation exchange membrane of a fluorinated polymer is preferably used as such membrane. In view of a production of an alkali metal hydroxide with high concentration at high current efficiency, carboxylic acid groups are preferably selected as the cation exchange groups.

When a conventional electrolyic cell equipped with asbestos diaphragms remains in a factory, if said ion exchange membrane is equipped in the conventional electrolytic cell instead of the asbestos diaphragm, the cost for installation is only small and an alkali metal hydroxide having high purity and high concentration can be obtained. When a cation exchange membrane of a fluorinated polymer having carboxylic acid groups as ion exchange groups is used for an electrolysis of an alkali metal chloride, the membrane is in a form of an alkali metal form as the alkali metal of the alkali metal hydroxide such as sodium form as the terminals of the carboxylic acid groups.

Thus, according to various studies, when a cation exchange membrane of a fluorinated polymer having carboxylic acid groups in the alkali metal form is used to install to a cell to cover each electrode such as in a bag form, the membrane has less flexibility not to easily perform the work and the membrane is easily damaged or teared by corners or edges of the electrode in the forcible installation of the membrane. Such trouble has been found in the use of the cation exchange membrane having carboxylic acid groups having the formula

—(COO)$_m$X wherein X represents an alkali metal atom or alkaline earth metal atom or —NHRR'R" and R, R' and R" respectively represent hydrogen atom or a lower alkyl group and m is a valence of X. On the other hand, according to various studies, it has been found that a membrane has a desired flexibility to easily install the membrane to cover the electrode especially to cover the electrode in a bag form without any damage and without any substantial deterioration of electrolytic characteristics in the use of the cation exchange membrane having carboxylic acid groups having the formula

—COOL wherein L represents hydrogen atom or a C$_1$–C$_{20}$ alkyl group.

In finger type electrolytic cells such as Diamond Shamrock cell and Hooker cell, anodes and cathodes are arranged to insert each electrode between the other polar electrodes in an assembly of the electolytic cell. In this case, when the membrane having carboxylic acid groups in the form of —(COO)$_m$X is covered on the electrodes having the same polarity in the assembly of the electolytic cell, the covered membrane is damaged or teared by collision or friction with the counter electrodes.

SUMMARY OF THE INVENTION

It is an object of the present invention to provide a method of installation of a cation exchange membrane of a fluorinate polymer having carboxylic groups to an electrolytic cell, preferably a finger type electrolytic cell without any damage by an easy manner.

The foregoing and other objects of the present invention have been attained by providing a method of installation of a membrane, for example, placed between each pair of electrodes of finger type electrolytic cell having each counter electrode inserted between the same polar electrodes, to be used in a form of a cation exchange membrane of a fluorinated polymer having ion exchange groups having the formula

—(COO)$_m$X wherein X represents an alkali metal atom or —NRR' and R and R' respectively represent hydrogen atom or a lower alkyl group; and m represents a valence of m, an improvement characterized by installing a membrane of a fluorinated polymer having ion exchange groups having the formula

—COOL wherein L represents hydrogen atom or a C$_1$–C$_{20}$ alkyl group, and said ion exchange groups having the formula

—COOL of said membrane are converted into said groups having the formula

—(COO)$_m$X.

DETAILED DESCRIPTION OF THE PREFERRED EMBODIMENTS

The cation eschange membrane of a fluorinated polymer having carboxylic acid groups used in the present invention has carboxylic acid groups having the formula $$-(COO)_mX$$

(m and X are defined above) in the condition of an electrolysis of an alkali metal chloride. The group X is preferably the same alkali metal atom of the alkali metal chloride in the electrolyte.

An ion exchange capacity of the carboxylic acid groups is important in view of characteristics of the membrane in the electrolysis and it is depending upon a kind of the fluorinated polymer for the membrane and it is preferably in a range of 0.5 to 4.0 meq/g dry polymer, especially 0.8 to 2.0 meq/g dry polymer in view of electrochemical characteristics and mechanical characteristics of the membrane.

The cation exchange membrane is preferably made of a fluorinated polymer having functional groups which can be converted into the groups of $-(COO)_mX$ in the condition of electrolysis which has the units:

(M) $+CF_2-CXX'+$ (M mole %)

(N) $+CF_2-CX+$ (N mole %)
$\phantom{(N) +CF_2-}|$
$\phantom{(N) +CF_2-}Y$ wherein X represents a fluorine, chlorine or hydrogen atom or $-CF_3$; X' represents X or $CF_3(CF_2)_m$; m represents an integer from 1 to 5; Y represents a unit having one of the formulae:

$+CF_2 \frac{}{x} A, -O+CF_2 \frac{}{x} A, +O-CF_2-CF \frac{}{y} A,$
$\phantom{+CF_2 \frac{}{x} A, -O+CF_2 \frac{}{x} A, +O-CF_2-}|$
$\phantom{+CF_2 \frac{}{x} A, -O+CF_2 \frac{}{x} A, +O-CF_2-}Z$ $-CF_2 + O-CF_2-CF \frac{}{y} A, +O-CF_2-CF \frac{}{x} + O-CF_2-CF \frac{}{y} A$
$\phantom{-CF_2 + O-CF_2-}|\phantom{CF \frac{}{y} A, +O-CF_2-}|\phantom{CF \frac{}{x} + O-CF_2-}|$
$\phantom{-CF_2 + O-CF_2-}Z\phantom{CF \frac{}{y} A, +O-CF_2-}Z\phantom{CF \frac{}{x} + O-CF_2-}Rf$ and $-O-CF_2-(CF-O-CF_2 \frac{}{x} +CF_2 \frac{}{y} +CF_2-O-CF \frac{}{z} A$
$\phantom{and -O-CF_2-(}|\phantom{CF-O-CF_2 \frac{}{x} +CF_2 \frac{}{y} +CF_2-O-}|$
$\phantom{and -O-CF_2-(}Z\phantom{CF-O-CF_2 \frac{}{x} +CF_2 \frac{}{y} +CF_2-O-}Rf$ x, y and z each represent an integer from 1 to 10; Z and Rf each represent $-F$ or a $C_1$-$C_{10}$ perfluoroalkyl group; and A represents a functional group which is convertible during electrolysis into a group having the formula $$-(COO)_mX$$

In the case of the fluorinated polymer having the units (M) and (N), it is preferable to have 1 to 40 mol % of the units (N) especially 3 to 25 mol % of the units (N) in view of the above-mentioned ion exchange capacity of the membrane.

A molecular weight of the fluorinated polymer for the cation exchange membrane used in the present invention is important since it relates to electrochemical characteristics and mechanical characteristics of the membrane and it is preferably in a range of $10 \times 10^4$ to $20 \times 10^5$ especially $15 \times 10^4$ to $10 \times 10^5$.

In the production of the fluorinated polymer, various processes can be employed. When it is produced by copolymerizing monomers for the units (M) and (N), it is possible to use a third monomer with said monomers for at least one in each group in the copolymerization whereby the resulting membrane can be improved. For example, it is possible to use $CF_2=CFORf$ (Rf represents a $C_1$-$C_{10}$ perfluoroalkyl group) as the third monomer so as to impart flexiblity for the resulting membrane. It is also possible to use a divinyl monomer such as $CF_2=CF-CF=CF_2$ and $CF_2=CFO(CF_2)_{1-4}OCF=CF_2$ so as to impart higher mechanical strength by crosslinking the copolymer.

The copolymerization of a fluorinated olefin monomer and a functional monomer having carboxylic acid group or a functional group convertible to carboxylic acid group, if necessary, a third monomer, can be carried out by a desired conventional process. Thus, the polymerization can be carried out by a catalytic polymerization, a thermal polymerization, a radiation-induced polymerization etc., if necessary with a solvent such as halogenated hydrocarbons. The fabrication of the copolymer into the cation exchange membrane can be carried out by the convention process such as a press-molding process, a rolling process, an extrusion molding process, a solution spreading process, a dispersion molding process and a powder molding process. A thickness of the membrane is preferably in a range of 20 to 600μ especially 50 to 400μ.

The cation exchange membrane used in the present invention is not limited to be made of only one kind of the polymer. For example, it is possible to use a laminated membrane made of two kinds of the polymers having a different ion exchange capacity, preferably low ion exchange capacity in the cathode side, or a laminated membrane having a weak acidic ion exchange group such as carboxylic acid group in the cathode side and a strong acidic ion exchange group such as sulfonic acid group in the anode side.

The cation exchange membrane used in the present invention can be fabricated by blending a polyolefin such as polyethylene, polypropylene, preferably a fluorinated polymer such as polytetrafluoroethylene and a copolymer of ehtylene and tetrafluoroethylene.

The membrane can be reinforced by supporting said copolymer on a fabric such as a woven fabric or a net, fibrile, a non-woven fabric or a porous film made of said polymer used in the blend. The weight of the polymers for the blend or the support is not considered in the measurement of the ion exchange capacity.

When the carboxylic acid groups of the membrane fabricated for covering the electrode are in the form of $-COOL$ (L is defined above), the membrane can be easily used for covering the electrode. When the carboxylic acid groups of the membrane are in the form of $-(COO)_mX$, the groups are converted into $-COOL$ (L is defined above). The conversion of the ion exchange groups can be carried out by a desired process depending upon the kind of L. For example, when L is H to convert $-(COO)_mX$ into $-COOH$, the membrane is brought into contact with an aqueous solution of an inorganic acid or an organic acid preferably in the presence of a polar organic compound. Suitable inorganic acids include mineral acids such as hydrochloric acid, sulfuric acid, nitric acid and phosphoric acid. Suitable organic acids include acetic acid, proponic acid, perfluoroacetic acid and p-toluene-sulfonic acid. The acid is preferable used as an aqueous solution having a concentration of 0.5 to 90 wt. %. Suitable polar organic solvents discretionarily used, can be methanol, butanol, ethyleneglycol, dimethylsulfoxide, acetic acid and phenol. The polar organic solvents can be incorporated into the aqueous solution at a ratio of 0.5 to 90 wt. %. The contact treatment of the membrane with the aqueous solution of an acid is preferably carried out at 10° to 120° C. for 30 minutes to 20 hours.

When L group of the membrane is converted into a $C_1$–$C_{20}$ alkyl group, the membrane is converted in the acid form followed by reacting it with a corresponding alcohol; or the membrane is converted in the acid form followed by reacting it with phosphorus trichloride or phosphorus oxychloride into an acid halide group and reacting it with a corresponding alcohol; or the membrane is converted in the acid form followed by reacting it with acetic anhydride or perfluoroacetic anhydride into an acid anhydride group and reacting it with a corresponding alcohol. It is possible to directly convert the —(COO)$_m$X group of the membrane into an aacid anhydride group by contacting the membrane with a chloride such as thionyl chloride, phosphorus trichloride and phosphorus oxychloride at 0° to 120° C. for 1 to 25 hours followed by reacting it with a corresponding alcohol.

In this invention, an alkyl group having $C_1$–$C_{20}$ is more preferable to hydrogen as L group of the membrane. Especially, an alkyl group having $C_1$–$C_5$ is most preferable from the electrochemical property of the membrane, hydrolyzed in the cell.

It is possible to convert —(COO)$_m$X group of the membrane into —COOL group with an alcohol in the presence of a small amount of an organic acid or an inorganic acid. Suitable alcohols used for the esterification of the acid, the acid halide or the acid anhydride are preferably alcohols having 1 to 20 carbon atoms such as methanol, ethanol, propanol, butanol, dodecyl alcohol and sebacyl alcohol. The esterification can be carried out by dipping the membrane in an aqueous solution of an inorganic acid or an organic acid which is the same as or different from the acid used in the conversion of —(COO)$_m$X group into the acid form. The dipping treatment is preferably carried out at 30° to 120° C. for 30 minutes to 40 hours.

The present invention is applicable to a filter press type cell or a finger type cell. When the present invention is applied to a finger type cell, the cation exchange membrane is easily installed in a finger type electrode comparing with conventional methods.

A finger type electrode cell used in the present invention includes not only a finger type construction cell described at page 93, "CHLORINE"- Its Manufacture, Properties And Uses", edited by J. S. Sconce, inssued Reinhold Publishing Corporation, New York, 1962, but also a flattened tube type construction. Nowadays, a flattened tube type construction cell is also generally called as a finger type electrolytic cell.

The present invention is available to a monopolar finger type cell or a bipolar finger type cell. As an electrolytic cell to which the present invention is applied, there are remodeled diaphragm electrolytic cells which are reconstructed by installing at least one depleted brine removing outlet and at least one water adding line in, for example, H-4 type, H-2A type manufactured by Hooker Chemicals & Plastics Corporation, DS-45 type DS-85 type manufactured by Diamond Shamrock Corporation, as a monopolar electrolytic cell; and "GLANOR" V-11-44 type manufactured by P.P.G. Industries Inc., as a bipolar electroytic cell. When the cells are manufactured newly, it is preferred to design such a construction as to be able to install the ion exchange membrane feasibly therein.

As a typical electrolytic cell used in the method of the present invention, a typical monopolar cell; DS-45 type electrolytic cell manufactured by Diamond Shamrock Co. will be illustrated.

In the electrolytic cell, vertical anodes made of an expanded metal of valve metal such as titanium as the substrate which is coated with an anode active component such as ruthenium oxide on the surface, are fixed on the bottom of the cell with each bolt so as to vertically arrange with each desired space to form an anode box. On the other hand, finger type cathodes made of an iron expanded metal which have sizes suitable for inserting between the vertical anodes are connected to form a cathode box.

In the conventional electrolytic cell, asbestos having a desired thickness is covered on the surfaces of the finger type cathodes and the cathodes covered with asbestos are inserted between the anodes fixed on the bottom of the cell.

In accordance with the present invention, the cation exchange membrane having carboxylic acid groups is installed as a membrane instead of asbestos diaphragm in the electrolytic cell. One embodiment will be illustrated.

Although a concrete means of installation of the membrane to the electrode is not critical, the membrane can be formed in a bag form by the conventional method to cover the bag membrane on the electrode. The membrane in the sheet form is used to cover the electrode and is bonded in the bag form. When the ion exchange group of the membrane is —COOL group in the bonding of the membrane, the decomposition temperature of the fluorinated polymer (a temperature for 5 wt. % of weight loss of the polymer in the heating at a rate of 10° C./min. in nitrogen atmosphere) is high to be in a range of 350 to 370° C. whereby the membrane can be easily heat-sealed with high strength. The heat-seal can be easily carried out by heating at about 100° to 330° C. preferably about 130° to 300° C. under a pressure of 1 to 300 kg/cm$^2$.

The cation exchange membrane of a fluorinated polymer having carboxylic acid groups in the form of —COOL is fabricated to a bag form having each opening suitable for inserting each anode in the basket form and the anodes are inserted in the bag membrane over each end of the bag membrane and the anodes with the ends of the bag membrane are respectively fixed on the bottom of the cell by a desired manner, whereby the opening ends of the bag membrane covering the anodes are placed at upper position of the anodes. Then, the cathodes in the cathode box are inserted between the anodes and a desired partition for separating an anolyte and a catholyte is placed at the opening of the cathode compartment and the opening ends of the bag membrane are bonded to the partition by a desired manner.

In the other embodiment, the cation exchange membrane fabricated in a cylindrical flare is inserted in each space between the cathodes and adjacent flare are heat-sealed to install the membrane to cathode box. Then, the finger type anodes are inserted in the cylindrical membrane to assemble the electrodes.

After the installation of the membrane, an aqueous solution of an alkali metal hydroxide such as sodium hydroxide at a concentration of 3 to 40% is fed into the cathode box from a desired part such as an outlet of a catholyte in the electrolytic cell whereby the carboxylic acid groups of the membrane in the —COOL form are converted into the form for the electolysis i.e. —(COO)$_m$X form from the side of the cathode compartment. Thus, the membrane can be easily installed to the electrolytic cell.

The typical process for converting carboxylic acid group of the cation exchange membrane in the —COOL form into the form for the electrolysis is to use an alkali metal hydroxide such as sodium or potassium hydroxide under heating. It is usual to use an aqueous solution of an alkali metal hydroxide at a concentration of 3 to 40 wt. % preferably 10 to 30 wt. % and to contact it with the membrane at a temperature of 5° to 120° C. preferably 50° to 100° C. for 1 to 100 hours. When the conditions are out of said ranges, a desired conversion into the form for the electrolysis may not be attained and the desired characteristics of the cation exchange membrane may not be imparted.

In the conversion of the carboxylic acid groups of the membrane into the form for the electrolysis, the titanium anodes coated with an active component such as ruthenium oxide or palladium oxide and titanium flames are placed in the electrolytic cell, and the anodes and the frames are relatively deteriorated by an alkaline material. If the conversion with an alkali metal hydroxide is carried out in the condition of empty in the anode compartment, the alkali metal hydroxide partially reaches to the anodes through the membrane. Therefore, it is preferable to charge or to feed an aqueous solution for preventing the corrosion of the anodes by the base such as an alkali metal chloride at a concentration of 50 to 330 g/l pf an aqueous solution of an alkali metal chloride preferably containing a mineral acid such as hydrochloric acid, sulfuric acid and nitric acid for corresponding to the alkali metal hydroxide leaked through the membrane into the anode compartment in the conversion of the membrane.

The present invention will be further illustrated by certain examples and references which are provided for purposes of illustration only and are not intended to be limiting the present invention.

DS-45 type asbestos diaphragm electrolytic cell manufactured by Diamond Shamrock Co. was used. A cation exchange membrane of a copolymer of $CF_2=CF_2$ and $CF_2=CFO(CF_2)_3COOCH_3$ having an ion exchange capacity of 1.45 meq/g dry polymer and a thickness of 220μ was installed to the cell.

The membrane was fabricated in a rectangular tube form having a length of 78 cm and a sectional view of 89 cm×6 cm and having both opening ends by a heat sealing process. Each flare having a width of 11 cm×109 cm and an opening of 89 cm×6 cm was heat-sealed on the membrane at the bottom or the cover. The resulting membrane with the flare was put in the spaces between the cathodes in the cathode box as spaces for inserting the anodes in the assembly. The upper and lower flares were respectively placed on the surfaces upper or lower end part of the cathode finger whereby the cation exchange membranes with the flare were put into few spaces partitioned by the cathode finger and the adjacent flares were respectively heat-sealed to cover the cathodes with the membrane. The upper and lower surfaces of the cathode box were also covered with the cation exchange membrane having heat-sealed flares. Then, the anodes were inserted in the rectangular tube membrane and the electrolytic cell was assembled by the suitable manner. A cover made of a fiber reinforced plastic for holding an aqueous solution of sodium chloride was fitted. 23 wt. % of NaOH aqueous solution was charged in the cathode compartment of the assembled electrolytic cell and an aqueous solution of NaCl having a concentration of 300 g/liter was charged in the anode compartment and the temperature of the solutions was raised to 90° C. An aqueous solution of NaCl having a concentration of 300 g/liter was fed at a rate of 850 liter/hour and 10% HCl aqueous solution was fed at a rate of 0.6 liter/hour so as to neutralize sodium hydroxide leaked through the membrane into the anode compartment, at 90° C. for 16 hours to complete the hydrolysis of the membrane. After the completion of the hydrolysis of the membrane, the feeding of the HCl aqueous solution was stopped and an aqueous solution of NaCl having a concentration of 300 g/liter was fed at a rate of 850 liter/hour into the anode compartment and an electrolysis was carried out at a current of 60 KA. In the normal states producing the catholyte having a concentration of NaOH of 35 wt. %, a cell voltage was 3.52 Volt and a purity of $Cl_2$ was 97.3%. A concentration of NaCl in the catholyte calculated at a concentration of NaOH of 50 wt. %, was 15 ppm. The result was excellent.

We claim:

1. A method of installing a shaped membrane in an electrolytic cell over an electrode wherein the material of the membrane consists of a fluorinated polymer containing active cation exchange groups of the formula: —(COO)$_m$X, wherein X is an alkali metal atom or —NHRR'R", wherein R, R' and R" independently represent hydrogen or lower alkyl and m is the valence of X, comprising:

installing said membrane in said cell as a fluorinated polymer containing carboxyl groups of the formula: —COOL, wherein L is hydrogen or $C_1$-$C_{20}$ alkyl over said electrode; and converting the carboxyl groups of the formula: COOL of said membrane into carboxyl groups of the formula:—(COO)$_m$X by passing an aqueous solution of an alkali metal hydroxide into a cathode compartment of said cell and passing an aqueous solution of an alkali chloride into an anode compartment of said cell.

2. A method of installing a shaped membrane between a given pair of electrodes in a finger type electrolytic cell having an electrode structure of an electrode of one polarity positioned between the electrodes of the opposite polarity, said membrane being utilized as a cation exchange membrane consisting of a fluorinated polymer having ion exchange groups of the formula: —(COO)$_m$X, wherein X is an alkali metal atom or —NHRR'R", wherein R, R' and R" independently represent hydrogen or lower alkyl, and m is the valence of X, comprising:

installing said membrane in said cell as a fluorinated polymer containing carboxyl groups of the formula: —COOL, wherein L is hydrogen or $C_1$—$C_{20}$ alkyl over all electrodes in said cell of the same polarity; and converting the carboxyl groups of the formula: —COOL of said membrane into carboxyl groups of the formula: —(COO)$_m$X, by passing an aqueous solution of an alkali metal hydroxide into a cathode compartment of said cell and passing an aqueous solution of an alkali chloride into an anode compartment of said cell.

3. The method of claim 1 or 2 wherein said aqueous solution of an alkali metal chloride in said anode compartment is acidic.

4. The method of claim 1 or 2, wherein the ion exchange capacity of said carboxylic acid groups of said cation exchange membrane is within the range of 0.8 to 2.0 meq/g of dry polymer.

5. The method of claim 1 or 2, wherein said cation exchange membrane is formed of a fluorinated polymer prepared from monomer units of the formula:

(M) $+CF_2-CXX'+$ (M mole %)

(N) $+CF_2CX+$ (N mole %)
     |
     Y wherein X represents a fluorine, chlorine or hydrogen atom or $-CF_3$; X' represents X or $CF_3(CF_2)-_m$; m represents an integer from 1 to 5; Y represents a unit selected from the group consisting of:

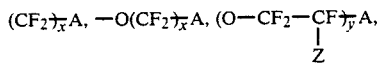

-continued

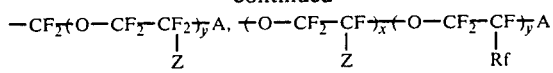

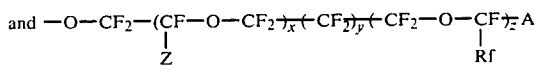

wherein x, y and z each represent an integer from 1 to 10; Z and Rf each represent —F or a $C_1$—$C_{10}$ perfluoroalkyl group; and A represents a functional group which is convertible during electrolysis into a group of the formula $-(COO)_mX$ as defined in Claim 1.

6. The method of claim 1 or 2, wherein said cation exchange membrane is a perfluoropolymer.

7. The method of claim 1 or 2, wherein said membrane is of a thickness ranging from 20 to 600 microns.

8. The method of claim 7; wherein said membrane is of a thickness ranging from 50 to 400 microns.

9. The method of claim 1 or 2, wherein said carboxyl group of the formula: —COOL is converted into the cation exchange form by treatment of the membrane with an aqueous solution of an alkali metal hydroxide at a concentration of 3 to 40 wt. % at a temperature of 5° C. to 120° over a period of 1 to 100 hours.

10. The method of claim 5, wherein the amount of units (N) in said fluorinated polymer ranges from 1 to 40 mole percent.

* * * * *